(12) United States Patent
Giroux et al.

(10) Patent No.: US 6,198,743 B1
(45) Date of Patent: Mar. 6, 2001

(54) TRAFFIC POLICING IN BROADBAND NETWORKS

(75) Inventors: Natalie Giroux, Hull (CA); Raymond Rui-Feng Liao, New York, NY (US); Angelo Bovolotto, Kanata (CA)

(73) Assignee: Alcatel Networks Corporation(CA)

( * ) Notice: Subject to any disclaimer, the term of this patent is extended or adjusted under 35 U.S.C. 154(b) by 0 days.

(21) Appl. No.: 09/011,739

(22) PCT Filed: Aug. 19, 1996

(86) PCT No.: PCT/CA96/00556
§ 371 Date: Jul. 29, 1998
§ 102(e) Date: Jul. 29, 1998

(87) PCT Pub. No.: WO97/07615
PCT Pub. Date: Feb. 27, 1997

(30) Foreign Application Priority Data

Aug. 18, 1995 (GB) .................................................. 9516931

(51) Int. Cl.$^7$ .............................. H04L 12/28; H04L 12/56
(52) U.S. Cl. ............................................... 370/395; 370/508
(58) Field of Search ................................... 370/395, 229, 370/235, 396, 398, 400, 251, 252, 253, 391, 468, 508, 509, 510, 517, 518, 512

(56) References Cited

U.S. PATENT DOCUMENTS

| | | | | |
|---|---|---|---|---|
| 5,432,713 | * | 7/1995 | Takeo et al. ........................ | 707/505 |
| 5,519,689 | * | 5/1996 | Kim .................................... | 370/232 |
| 5,524,006 | * | 6/1996 | Hluchyj et al. ..................... | 370/233 |
| 5,530,695 | * | 6/1996 | Dighe et al. ........................ | 370/232 |
| 5,666,353 | * | 9/1997 | Klausmeier et al. ................ | 370/230 |
| 5,677,907 | * | 10/1997 | Hamada et al. ..................... | 370/253 |
| 5,691,975 | * | 11/1997 | Hamada et al. ..................... | 370/232 |
| 5,930,234 | * | 7/1999 | Yoshida ............................... | 370/232 |

* cited by examiner

Primary Examiner—Douglas W. Olms
Assistant Examiner—Phirin Sam
(74) Attorney, Agent, or Firm—Larson & Taylor, PLC

(57) ABSTRACT

A method is disclosed for traffic policing in packet-based, broadband networks, such as ATM networks. The method comprises the steps of monitoring the arrival of incoming cells, and advancing a reference clock on a step of I if an arrival is late but not later than I, where I is an increment, and if an arrival is later than I assuming a new busy period and setting the reference clock at the arrival time.

5 Claims, 3 Drawing Sheets

TRAFFIC POLICING IN BROADBAND NETWORKS

FIELD OF THE INVENTION

This invention relates to a method of traffic policing in broadband cell-based networks, such as ATM (Asynchronous Transfer Mode) Networks

DESCRIPTION OF THE RELATED ART

In ATM networks, service providers rely on User Parameter Control (UPC) to protect network resources from malicious and unintentional misbehavior which can affect the Quality-of-Service (QoS) of other established connections.

One popular implementation of UPC is the Generic Cell Rate Algorithm (GCRA) as defined in 'ATM Forum Traffic Management Specification', Version 4.0, April 1996, which is herein incorporated by reference, and 'Broad Band Switching System (BSS) Generic Requirement', Bellcore GR-1110-CORE, Sept. 1994.

It is presented as GCRA(I, L) with two parameters, the increment I and the Limit time L. When it is used to police the Peak Cell Rate (PCR) of a connection, it becomes GCRA(1/PCR, CDVT); when it is applied to police Sustainable Cell Rate (SCR), it becomes GCRA(1/SCR, BT).

In one version, the GCRA is a virtual scheduling algorithm that updates the Theoretical Arrival Time (TAT) of a cell, which is the nominal arrival time of the cell assuming that the active source sends equally spaced cells. If the actual arrival time of a cell is not "too" early relative to the TAT, and in particular if the actual arrival time is after TAT-L, then the cell is considered conforming, otherwise it is considered non-conforming.

At the arrival time of the first cell $t_a(1)$, the theoretical arrival time is initialized to the current time, $t_a(1)$. For subsequent cells, it is the arrival time of the $k^{th}$ cell, $t_a(k)$, is actually the current value of TAT then the cell is conforming and TAT is updated to the current time $t_a(k)$, plus the increment I. If the arrival time of the $k^{th}$ cell is greater than or equal to TAT-L but less than TAT, then again the cell is conforming, and the TAT is increased by the increment I. Lastly, if the arrival time of the $k^{th}$ cell is less than TAT-L (i.e., if TAT is greater than $t_a(k)+L$, then the cell is non-conforming and the TAT is unchanged.

In ATM networks, a risk exists that a cell delay variation tolerance (CDVT) that is not large enough may be specified at user-network and network-network interfaces because cell delay variation (CDV) is ubiquitous due to the slotted nature of cell transmission, multiplexing and clock variation. Also slight rate shifting can occur because of mismatched clocks.

A policing algorithm such as GCRA is too stringent to end-users because it is so sensitive to minor violations that the end-users may receive a transmission capacity significantly lower than what they have paid for. In the worst case, it can be only one-half of what they have paid for. Furthermore, to end-users, the unfairness to VCs (virtual Channels) violating traffic contracts is not acceptable because a VC with minor rate violation may get penalized far more than a VC with large rate violation.

The paper "Proceedings of the International Switching Syposium", vol. 1–2, 25 October 1992, Institute of Electronics; Information and Communication Engineers, pages 316–320 discusses a virtual scheduling algorithm for ATM networks. This proposal does not, however, address the unfairness problems associated with the GCPA algorithm.

BRIEF SUMMARY OF THE INVENTION

An object of the invention is to alleviate the disadvantages of the GCRA algorithm, such as unfairness and sensitivity to minor contract-violation.

According to the present invention there is provided A method of traffic policing in packet-based, broadband asynchronous networks, such as ATM networks, comprising the steps of measuring the actual arrival time $t_{a(k)k}$ of incoming cells k, providing a reference clock that maintains a time representing the theoretical arrival time of a current incoming cell, determining whether the current incoming cell is conforming or non-conforming to a predetermined condition, advancing said clock by an increment I after the arrival of each conforming cell to determine the theoretical arrival time of the next incoming cell, and if the current incoming cell is late by an amount greater than its theoretical arrival time plus the value of the increment I, updating the theoretical arrival time for the current cell to the actual arrival time for the current cell prior to advancing said reference clock.

The new method is more robust than GCRA. It resolves the drawbacks in the GCRA algorithms such as unfairness to VCs slightly violating their traffic contracts, and sensitivity to CDV which is dependent on unknown aggregate traffic behavior; on the other hand it bounds the CDV or BT (Burst Tolerance) of the conformed cell-stream. The method in accordance with the invention provides end users with a more gracious network environment than GCRA at the expense of limited extra bandwidth and buffering requirements on networks and user-end equipment.

The method brings the end-user an admitted rate much closer to the PCR (Peak Cell Rate). Although an increase on cell-clumping in the delivered traffic is expected as fewer cells are discarded, the increase is bounded and the impact on switch resource allocation and the AAL (ATM Adaptation Layer) cell-assembly buffer is also limited.

The invention also provides a user parameter control moduler for implementing traffic policing in packet-based, broadband networks, such as ATM networks, comprising means for monitoring the arrival of incoming cells, means for advancing a reference clock on a step of I if an arrival is late but not later than I, where I is an increment, and if an arrival is later than I assuming a new busy period and means for setting the reference clock at the arrival time.

BRIEF DESCRIPTION OF THE DRAWINGS

The invention will now be described in more detail, by way of example only, with reference to the accompanying drawings, in which.

DETAILED DESCRIPTION OF THE INVENTION

Figure 1:
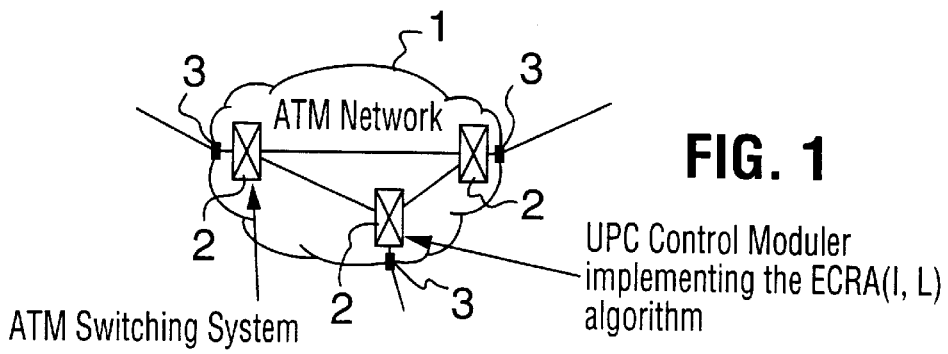
FIG. 1 is a block diagram of an ATM switching system implementing the invention.

Referring to FIG. 1, an ATM network 1 comprises a plurality of interconnected ATM switches 2. UPC (User Parameter Control) modulers 3 implementing the invention protect the network from malicious and unintentional misbehaviour by performing traffic policing on arriving cells.

Figure 2:
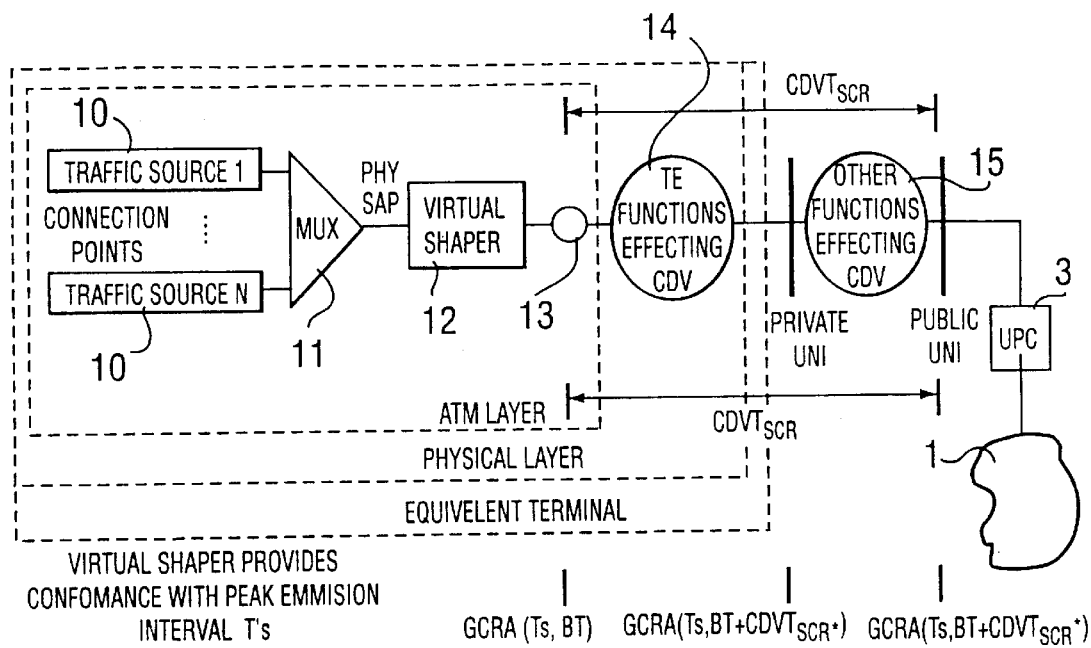
FIG. 2 shows an access point to an ATM network in more detail.

In FIG. 2, the access connection to the ATM network is shown in more detail using a conventional GCRA algorithm. Traffic sources $10_1 \ldots 10_N$ are connected through MUX 11 and virtual shaper 12 implementing traffic shaping to PHY SAP 13 (Physical Service Access Point). From there cells pass through terminal units 14, 15 to UPC 3.

Figure 3:
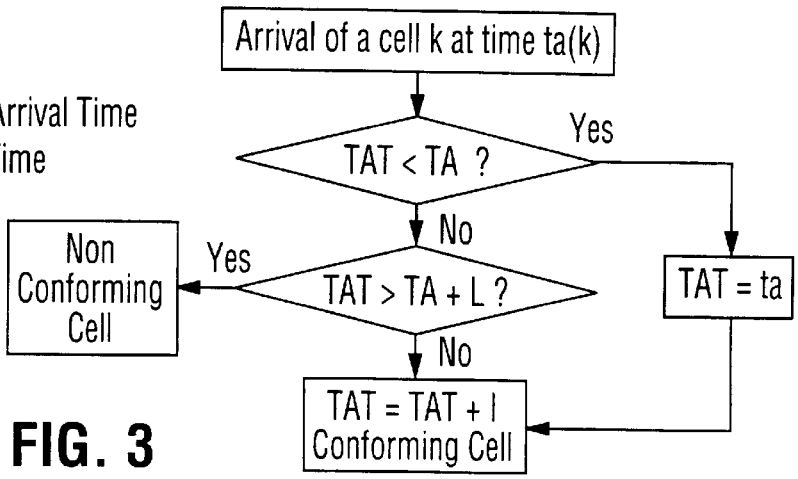
FIG. 3 shows GCRA(I, L) in the version of Virtual Scheduling Algorithm.

FIG. 3 depicts the prior art GCRA(I, L) in the Virtual Scheduling Algorithm version.

When $t_a(k) < TAT(k) - L$, a cell arriving at $t_a(k)$ is regarded as non-conforming and the reference clock TAT is frozen until the next arrival. When $t_a(k) > TAT(k)$, namely a late arrival occurs, the reference clock TAT takes a "gap-skip" and restarts from the arrival time.

The purpose of gap-skip is to eliminate the effect of gaps in the measurement of cell-clumping, and to allow GCRA to focus on enforcing CDVT, which is actually defined as cell-clumping tolerance or positive-CDV tolerance instead of CDV tolerance. The conformed cell streams after GCRA have consecutive cell-clumpings bounded by CDVT, and therefore the CAC (Connection Admission Control) function inside the switch can accordingly allocate resources to meet the QoS objectives of compliant connections.

However, solely enforcing CDVT can cause a significant reduction on the admitted cell rate of VCs (Virtual Channels) violating traffic contracts, sometime as low as one-half of the declared PCR.

Figure 4:
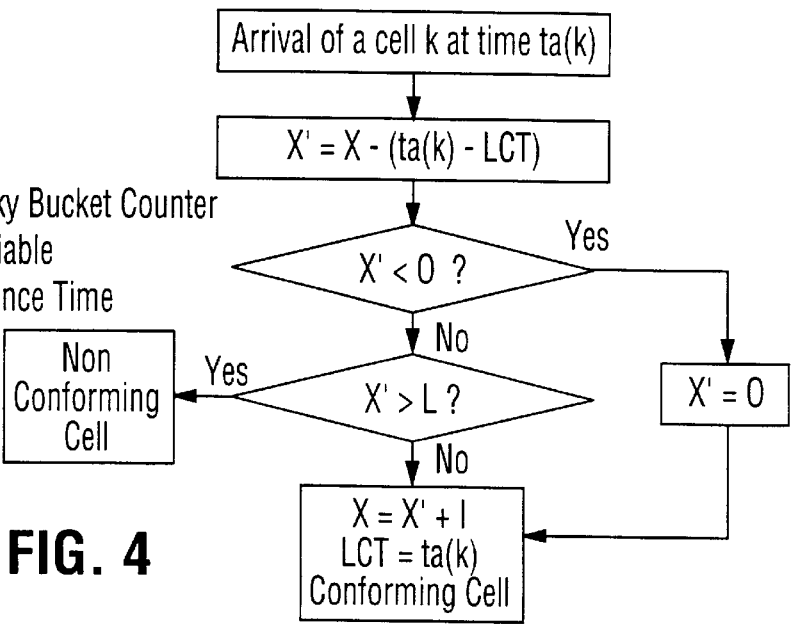
FIG. 4 shows GCRA(I, L) in the version of Continuous-State Leaky Bucket Algorithm.

An alternative implementation of GCRA(I, L) is shown in FIG. 4.

Figure 5:
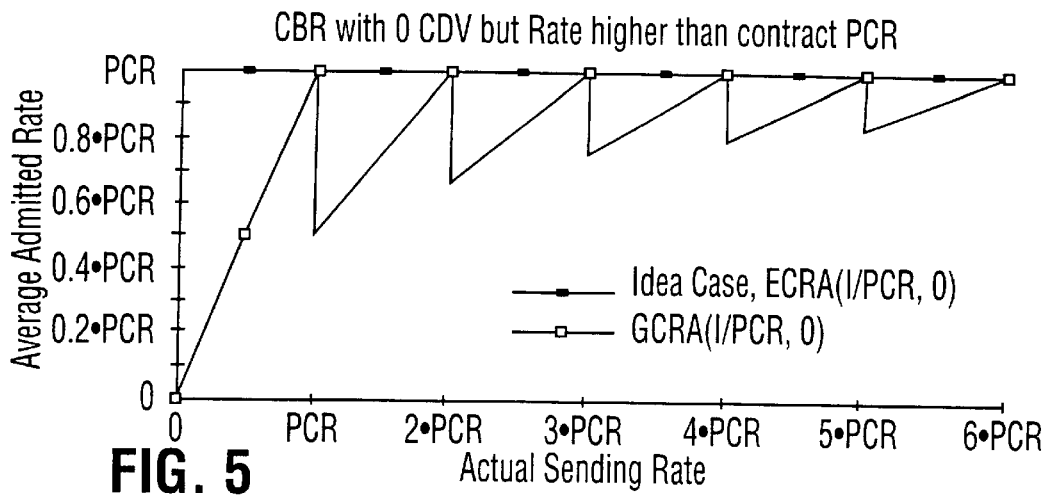
FIG. 5 is a comparison of GCRA(1/PCR, 0) and ECRA (1/PCR, 0) on CBR Exceeding Contract PCR.

FIG. 5 demonstrates one example: Looking at the GCRA (I, L), for a CBR (Constant Bit Rate) VC with a zero CDV but sending rate R higher than the contracted PCR, the admitted rate after GCRA(1/PCR, 0) is $R_a = R / \lceil_{PCR}^R \rceil$, where $\lceil x \rceil$ denotes the minimum integer larger than x.

A closer look at FIG. 5 reveals the unfairness: a VC with minor rate violation may receive smaller admitted rate than a VC with large rate violation, and the worst penalty. An admitted rate about one-half of the contract PCR is imposed on the VC with an infinitesimal violation over the PCR.

In GCRA(I, L), the effect of gap-skip is equivalent to adding a positive phase to the original reference clock. The original reference TAT advances by steps equal to integer number of I's, gap-skip sets TAT(k) to $t_a(k)$, which is equivalent to adding the original evolved TAT with a phase—$(t_a(k) - TAT(k)) \% I$. ($x \% y$ is the remainder of $x \div y$)

If the phase is not added, namely the reference clock $TAT_E$ still advances by steps of I's, then for the next arrival, the $(k+1)^{th}$ cell arrival, the new reference clock $TAT_E(k+1)$ is earlier than the GCRA reference clock $TAT_G(k+1)$ by a phase of $(t_a(k) - TAT_E(k)) \% I$. Therefore, cell loss caused by late arrival can be avoided.

Figure 6:
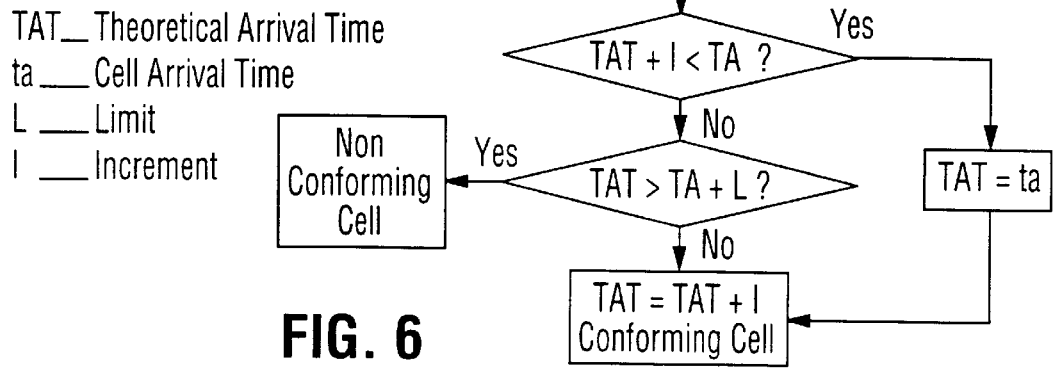
FIG. 6 shows ECRA(I, L) in the version of Virtual Scheduling Algorithm.

The present invention is based on the above observation. In the method according to the invention, known as ECRA(I, L) (Enhanced Cell Rate Algorithm) shown in FIG. 6, for the ECRA(l,L), the reference clock TAT advances by an increment I if a cell arrival is late but not later than I. This avoids the impact of late arrival on the following cells. If the arrival is later than I, a new busy period is assumed to start and the clock is set at the arrival time. In this way, the clock's reference point is allowed to be refreshed. This is better than having fixed reference point, which may already have a delay variation.

Figure 7:
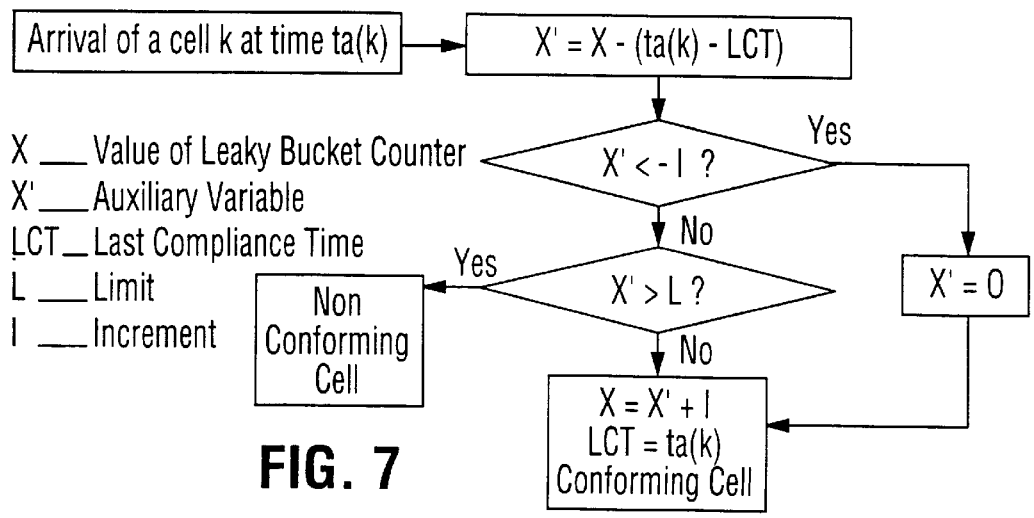
FIG. 7 shows ECRA(I, L) in the version of Continuous-State Leaky Bucket Algorithm.

FIG. 7 shows an alternative implementation in accordance with the invention employing a continuous leaky bucket algorithm.

In the described method the admitted rate of conformed traffic is always equal to or higher than the admitted rate in GCRA. Specifically, for connections with a zero CDV but a larger sending rate than PCR, ECRA(1/PCR, 0) guarantees the average admitted rate equals to PCR.

This dramatic improvement over GCRA(1/PCR, 0) is shown in FIG. 4 by substituting the "Ideal Case" with "ECRA(1/PCR, 0)".

Figure 8:
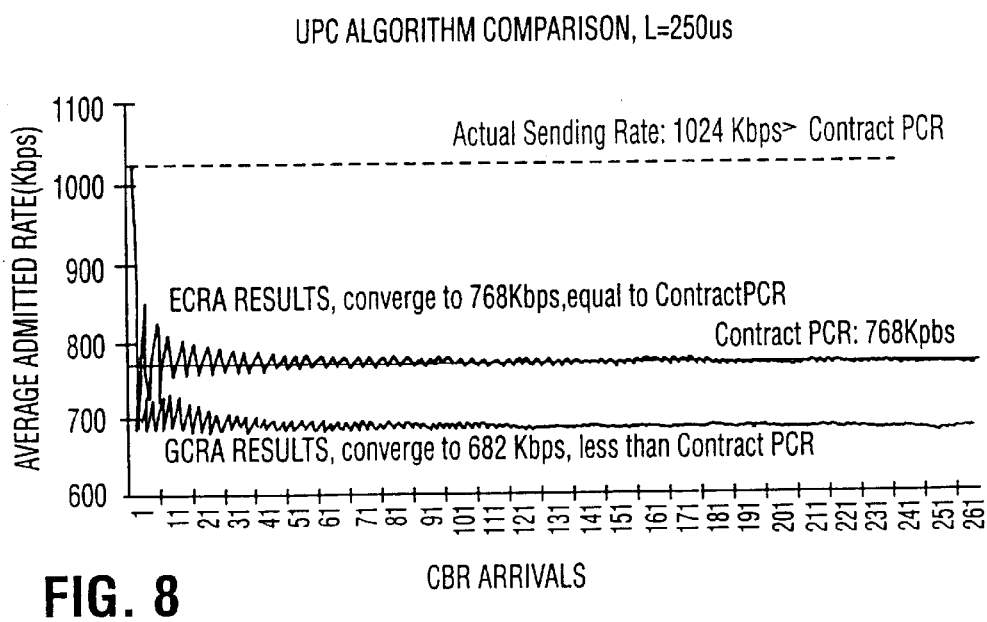
FIG. 8 shows a Receiver End Average Admitted Rate Comparison.

A large improvement is also observed when CDVT>0. FIG. 8 shows one example observed in a test lab. A CBR with sending rate of 1024 Kbps receives only 1024*2/3=683 Kbps instead of 1024*3/4=768 Kbps when passing through GCRA(53*8/768 K, 250 $\mu$s). In fact, the GCRA discarded one in every three cells while the ECRA with the same parameters discarded one in every four cells.

When the described method and GCRA are used to police the PCR and CDV Tolerance of a connection, the maximum positive CDV of conformed cell stream after implementation of the described method may be higher than the maximum positive CDV of conformed cell stream after GCRA. However, the increment is bounded by $$\max_{\forall K \in Z^+} \{|TAT_{ECRA}(k) - TAT_{GCRA}(k)|\} < l.$$

When the described method and GCRA are used to police the SCR and burst tolerance of a connection, the maximum burst size of conformed cell stream after may be higher than the maximum burst size of conformed cell stream after GCRA, but the increment is at most 1 cell.

The described method is also more tolerant to VCs with minor traffic violations; therefore an increment on network resource allocation is expected. However, only a small increment is required for bandwidth allocation inside switches. The extra buffer requirement is minor because the traffic burst size is at most increased by one cell. To end users, this means just increasing the AAL assemble buffer by one more cell.

The interoperability between the described method and GCRA is not an issue if the described method is implemented after GCRA. If a GCRA is at a Network-Network Interface, the CDVT or BT must be large enough to accommodate cell-clumping caused by queuing and multiplexing inside the network. The effect of an ECRA at a User-Network Interface in front of the GCRA is bounded to be small compare to the cell-clumping caused inside the network, and therefore can be ignored.

The described method (ECRA) thus addresses the drawbacks of GCRA algorithm such as unfairness and sensitivity to minor contract-violation. On one hand, the algorithm brings end-user an admitted rate much closer to PCR; on the other hand, although an increase on cell-clumping in the delivered traffic is expected as fewer cells are discarded, the increase is bounded and the impact on switch resource allocation and AAL cell-assemble buffer is also limited.

Thus compared to the prior art approach, the present invention avoids skipping the reference arrival clock if an arrival is late, but not later than I, and hence avoids the impact of the late arrival of the following cells.

This approach does not complicate the implementation, but dynamically adjusts to traffic variations and effectively brings the admitted rate close to PCR while keeping the CDVT tightly bounded.

The ECRA algorithm resolves the unfairness of GCRA to VCs slightly violating traffic contract, and increases the robustness of GCRA to minor traffic-violations.

What is claimed is:

1. A method of traffic policing in packet-based, broadband networks, such as ATM networks, comprising the steps of measuring actual arrival times of incoming cells, providing a reference clock that maintains a time representing a theoretical arrival time of a current incoming cell, determining whether the current incoming cell is conforming or non-conforming to a predetermined condition, advancing said clock by an increment I after the arrival of each conforming cell to determine the theoretical arrival time of a next incoming cell, and if the current incoming cell is late by an amount greater than I beyond its theoretical arrival time, updating the theoretical arrival time for the current cell to an actual arrival time for the current cell prior to advancing said reference clock.

2. A method as claimed in claim 1, which implements the following algorithm:

determine the theoretical time TAT of a current incoming cell;

measure the arrival time $t_a(k)$ of an incoming cell k;

if TAT+I<$t_a(k)$ set TAT=$t_a(k)$ set TAT=TAT+I else if TAT>$t_a(k)$+L, where L is a predetermined limit declare cell non-conforming else set TAT=TAT+I.

3. A method as claimed in claim 1, which is implemented using a leaky bucket algorithm.

4. A method as claimed in claim 3, which implements the following algorithm:

measure the arrival time $t_a(k)$ of an incoming cell k;

set a variable X'=X−($t_a(k)$−LCT), where X is a value of the leaky bucket counter and LCT is a time of arrival of the last conforming cell;

if X'<−I, set X'=0, X=I, and LCT=$t_a(k)$;

else if X'<L, where L is a predetermined limit, declare the current cell non-conforming else set $X=X'+I$, $LCT=t_a(k)$.

5. A user parameter control moduler for implementing traffic policing in packet-based, broadband networks, such as ATM networks, comprising means for measuring actual arrival times of incoming cells, a reference clock for maintaining a time representing the theoretical arrival time of a current incoming cell, means for determining whether the current incoming cell is conforming or non-conforming to a predetermined condition, means for advancing said clock by an increment I after the arrival of each conforming cell to determine the theoretical arrival time of a next incoming cell, and if the current incoming cell is late by an amount greater than I beyond its theoretical arrival time, updating the theoretical arrival time for the current cell to the actual arrival time for the current cell prior to advancing said reference clock.

* * * * *